United States Patent

[11] 3,592,050

| [72] | Inventors | Alfred W. Nutt, Jr.<br>Los Alamos, N. Mex.;<br>Joseph H. Handwerk, Joliet, Ill. |
|---|---|---|
| [21] | Appl. No. | 837,459 |
| [22] | Filed | June 30, 1969 |
| [45] | Patented | July 13, 1971 |
| [73] | Assignee | The United States of America as represented by the United States Atomic Energy Commission |

[54] METHOD OF DETECTING INHOMOGENEITIES IN CERAMICS
1 Claim, 1 Drawing Fig.

[52] U.S. Cl. .................................................... 73/67.2
[51] Int. Cl. ................................................ G01n 24/00
[50] Field of Search ........................................... 73/67.2

[56] References Cited
UNITED STATES PATENTS

| 3,019,387 | 1/1962 | Rowe | 73/67.2 X |
| 3,106,838 | 10/1963 | Crooks | 73/67.2 |
| 3,308,650 | 3/1967 | Fitzgerald | 73/67.2 |
| 3,345,861 | 10/1967 | Heath | 73/67.2 |

Primary Examiner—Richard C. Queisser
Assistant Examiner—Arthur E. Korkosz
Attorney—Roland A. Anderson ABSTRACT: A method of detecting inhomogeneities in a ceramic solid solution by measuring the internal friction in the solid solution and comparing it with a standard. This was done by vibrating a sintered bar formed from the solid solution at mechanical resonance and comparing the rate of amplitude decay of the vibrations with a standard.

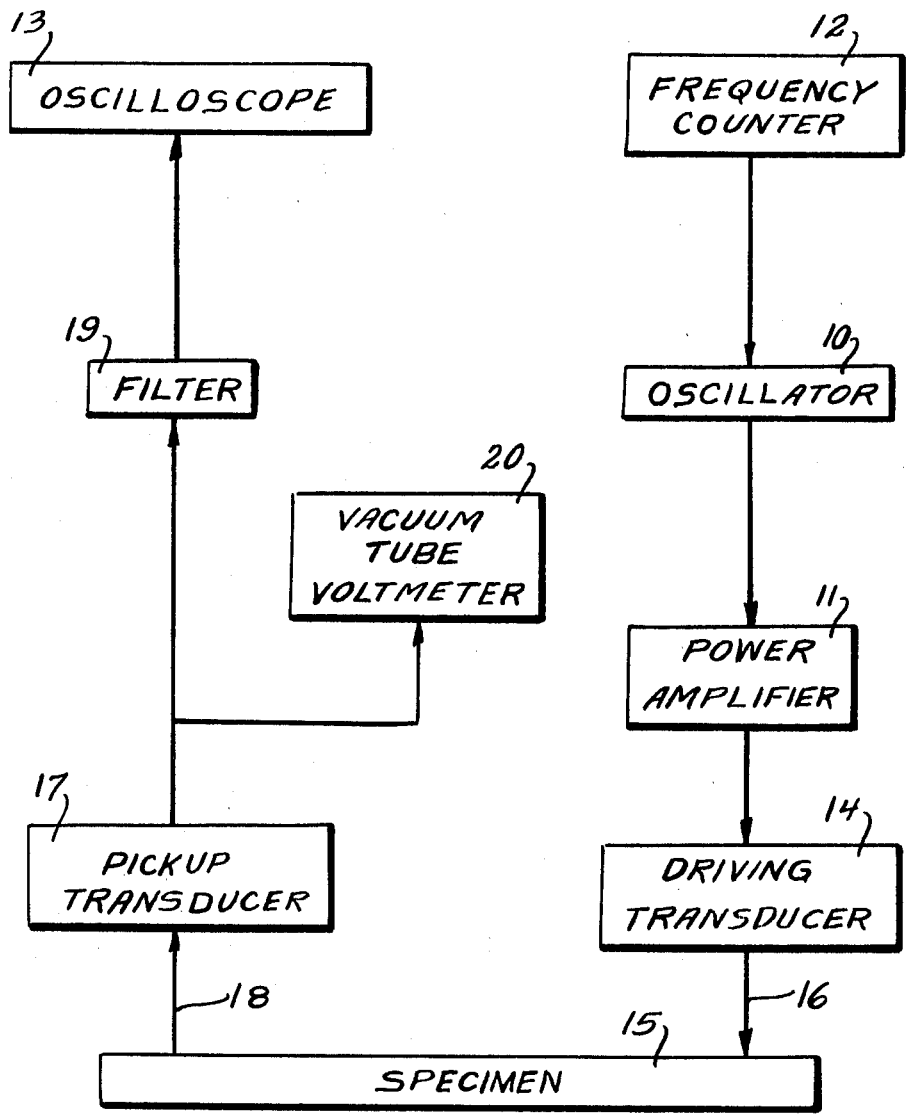

METHOD OF DETECTING INHOMOGENEITIES IN CERAMICS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of detecting inhomogeneities in a ceramic body. In more detail, the invention relates to a nondestructive method of detecting inhomogeneities in a body formed from a solid solution of uranium and plutonium dioxides. In still more detail, the invention relates to a nondestructive method of detecting the presence of plutonium dioxide concentrations in a solid solution of plutonium dioxide in uranium dioxide.

Ceramic mixtures are important in many fields and particularly is this so in the field of atomic power. Fast breeder nuclear reactors require for operation both a fissionable fuel and a fertile fuel and a mixture of unenriched uranium dioxide and plutonium dioxide has many advantages for use in such reactors. It is desirable that this mixture be as uniform as possible since inhomogeneities may adversely affect both the physical and nuclear properties of the fuel material. Since uranium dioxide and plutonium dioxide form a complete series of solid solutions, it is possible to prepare fuel pellets—the form of ceramic fuel most frequently used—which are essentially homogeneous. While this is true theoretically, in practice, fuel pellets actually prepared frequently contain undesirable plutonium dioxide concentrations in the solid solution. Most testing methods now known which are capable of detecting the presence of such inhomogeneities—such as microprobe analysis—call for destruction of the sample. A simple, nondestructive testing method by which the presence of such inclusions or concentrations if fuel pellets can be detected is therefore indicated.

Sonic resonance and ultrasonic velocity inspection techniques depend upon the principle that the propagation of sonic or ultrasonic energy is influenced by the acoustic properties of the media in which it is propagating. Ultrasonic detectors employing this principle have been used for detecting flaws in metal bodies. So far as we are aware, this principle has not previously been employed in the detection of inhomogeneities in ceramic bodies such as a solid solution of plutonium dioxide in uranium dioxide.

SUMMARY OF THE INVENTION

According to the present invention, inhomogeneities such as inclusions or concentrations of plutonium dioxide are detected in a ceramic solid solution such as a solid solution of plutonium dioxide in uranium dioxide by measuring the internal friction thereof and comparing it with a standard. For example, a bar consisting of a solid solution of plutonium dioxide in uranium dioxide is subjected to mechanical resonant vibrations, the rate of amplitude decay of the vibrations is measured, this rate being a measure of the internal friction in the bar, and the rate of amplitude decay in the bar is compared with a standard.

BRIEF DESCRIPTION OF THE DRAWING

The FIGURE is a block diagram illustrating the procedure followed in practicing the present invention.

SPECIFIC EMBODIMENT OF THE INVENTION

As shown, the output of an oscillator 10—operating at a predetermined frequency—goes to amplifier 11 and frequency counter 12. Oscillator 10 drives transducer 14 through amplifier 11 to generate sonic vibrations which are transmitted to specimen 15 via a thread 16 held under tension by the weight of specimen 15. Sound propagates through specimen 15 and radiates therefrom to a pickup transducer 17 via a thread 18 held under tension by the weight of specimen 15. Transducer 17 transforms the radiated sound to an electrical signal which is transmitted by way of filter 19 to oscilloscope 13. A vacuum tube voltmeter 20 is coupled to the output of transducer 17 to indicate the amplitude thereof.

The technique used is that first described by Förster in "A New Method for the Determination of the Modulus of Elasticity and Damping," Z. Metallkunde 29, 116 (1937). To support the specimen 15, cotton threads 16 and 18 were used which were attached to 1/10 by 1 ½-inch dowel pins mechanically linked to the driving transducer 14 and to the pickup transducer 17. Epoxy resin was the bonding agent between the thread and dowel pins. Driving transducer 14 was a modified crystal cutting head and pickup transducer 17 was a phonograph cartridge. The driving transducer was modified by removing the unshielded lead wires and replacing them with shielded coaxial cable. This modification decreased "crosstalk" coupling to the pickup transducer. Both the driver and the pickup crystals were made from Rochelle salt. Since a great deal of 60-cycle noise (electrical and mechanical) was present in an unfiltered signal, filter 19 was employed to reduce this noise to an acceptable value.

The following experimental data were obtained on specimens formed of 80 percent uranium dioxide and 20 percent plutonium dioxide. Table I lists the various plutonium dioxide agglomerate ranges used in this experiment.

TABLE I

| | PuO₂ sieve size | PuO₂ micron range | UO₂ sieve size |
|---|---|---|---|
| Sample: | | | |
| 11–12 | (¹) | | |
| 13–14 | −200+325 | 44–74 | −325 |
| 15–16 | −140+170 | 88–105 | −325 |
| 17–18 | −80+100 | 149–177 | −325 |
| 19–20 | −40+ 60 | 250–420 | −325 |

¹ Ball milled 3 hrs.

Samples 11 and 12 were fabricated as homogeneous control specimens by wet milling (3 hours), vacuum drying, pressing (1,050 kg./cm.²), granulating (−20mesh), and compacting (900 kg./cm.²). Samples 13–20 were composed of −325 mesh agglomerate uranium dioxide (1 percent Carbowax 4,000) and different mesh range agglomerates of plutonium dioxide (1 percent Carbowax 4,000). The small approximately spherical particulates resulting from this operation poured readily into die cavity and were bidirectionally compacted (900 kg./cm.²) into rectangular bars approximately 0.4 cm. by 0.6 cm. by 7.5 cm. All samples were sintered together at 1,525° C. in pure hydrogen following binder removal in hydrogen at 350° C. The samples were cooled to 850° C., equilibrated for 2 hours, cooled to room temperature and were then ground and polished so as to contain flat and parallel sides. The size of the samples used was about 0.2 ×0.3×7.5 cm. The samples prepared had the formula $U_{0.8}Pu_{0.2}O_{1.982}$.

The first step was to determine the fundamental flexural and torsional resonant frequency. The fundamental flexural frequency was identified through verification of its calculated harmonic frequencies and the approximate fundamental torsional resonant frequency was calculated by assuming that Poisson's ratio was 0.30.

The sample internal friction was determined from free decay at flat fundamental resonance using the following equation $$Q_m^{-1} = \frac{\ln(A_0/A_n)}{\pi f_r (\Delta t)}$$

where $A_n$ is the amplitude of vibration at $t_n$, $\Delta t$ is the time of decay $= (t_n - t_o)$, and $f_r$ is the fundamental resonant frequency.

The amplitude decay was displayed on the storage oscilloscope 13 by simultaneously activating the single sweep of the oscilloscope and cutting the acoustic excitation to the sample. The resulting decay trace was photographed and measured to determine $A_o$ and $A_n$ for the time interval $\Delta t$.

The effect of specimen inhomogeneity upon room temperature internal friction of $U_{0.8}Pu_{0.2}O_{1.982}$ is shown in Table II.

TABLE II

| PuO₂ agglomerate size and sintering treatment | Area deviation M $\mu\%$ UO₂ × 10³ | Internal friction × 10⁵ | Q⁻¹ standard deviation × 10⁵ |
| --- | --- | --- | --- |
| Ball milled 4 hrs., 1,525° C. He 6% H₂, 4 hrs | 2.5 | 1.59 | 0.22 |
| Ball milled 3 hrs., 1,525° C. H₂, 4 hrs | 3.8 | 2.56 | 0.56 |
| −200 +325 mesh, 1,525° C. H₂, 4 hrs | 14.4 | 35.23 | 3.47 |
| −140 +170 mesh, 1,525° C. H₂, 4 hrs | 18.8 | 33.87 | 4.05 |
| −80 +100 mesh, 1,525° C. H₂, 4 hrs | 19.1 | 31.17 | 4.62 |
| −60 +80 mesh, 1,525° C. H₂, 4 hrs | 45.1 | 27.42 | 3.95 |

The area deviation was obtained from microprobe studies and is the urania deviation from the calibrated 80 percent uranium dioxide compositional level as measured with a planimeter on a microprobe scan over a scanning length of 1,500 microns and is reported as micron-percent deviation.

There is an obvious increase of internal friction (about a factor of 14) with increased specimen heterogeneity. This substantial difference in internal friction makes it easy to develop a procedure for routinely nondestructively testing bodies for heterogeneity. For example, the time within which the amplitude of vibration decreases to a predetermined value, as seen on the oscilloscope, can be compared either by an individual or by conventional electrical circuitry with the time within which the amplitude of vibration of a body of known homogeneity decreases to detect particles having an undesired degree of heterogeneity.

It is surmised that the small decrease of apparent internal friction from the −200+325 mesh plutonia sample to the −60 +aJ80 mesh plutonia sample is indicative of the fact that the internal friction is sensitive to the number of scattering centers. Thus measurements of internal friction clearly show qualitatively whether gross heterogeneity is present or not and there is some quantitative ability to measure the degree of solid solution in assimilated PuO₂.

The procedure as above described is a valuable tool for determining the extent of solid solution specimen homogeneity, since it does not require the destruction of the specimens, as is true of microprobe analysis. The determination is not limited to the resonance technique where sample preparation and geometric tolerances would prevent its use for anything other than research purposes. Ultrasonic "Q" techniques wherein specimens of almost any size or shape are inserted in a collimated beam of ultrasonic waves and the results are compared with a standard could also be used, as could half-height peak internal friction calculations.

It will be understood that the invention is not to be limited to the details given herein but that it may be modified within the scope of the appended claims.

The embodiments of the invention in which we claim an exclusive property or privilege are defined as follows:

1. A method of determining the quality of homogeneity of a solid solution consisting of plutonium dioxide sized less than 420 microns dissolved in uranium dioxide comprising vibrating a sample thereof at resonant frequency, terminating said vibration, determining the internal friction of the sample by measuring the rate of amplitude decay of said vibrations, and comparing said rate of amplitude decay with the rate of amplitude decay obtained by applying the same procedure to a plutonium dioxide—uranium dioxide solid solution of known homogeneity.